(12) United States Patent  
Okajima et al.

(10) Patent No.: US 6,309,776 B1  
(45) Date of Patent: Oct. 30, 2001

(54) ASSEMBLED STORAGE BATTERY UNIT OF THE COLLECTIVE TYPE

(75) Inventors: Hideki Okajima; Takashi Oda, both of Naruto; Michinori Ikezoe, Itano-gun, all of (JP)

(73) Assignee: Sanyo Electric Co. Ltd., Osaka (JP)

( * ) Notice: Subject to any disclaimer, the term of this patent is extended or adjusted under 35 U.S.C. 154(b) by 0 days.

(21) Appl. No.: 09/239,305

(22) Filed: Jan. 29, 1999

(30) Foreign Application Priority Data

Jan. 29, 1998 (JP) .................................................. 10-017234

(51) Int. Cl.[7] ............................... H01M 2/06; H01M 6/42
(52) U.S. Cl. ........................... 429/151; 429/148; 429/176
(58) Field of Search ................................... 429/148, 163, 429/176, 151

(56) References Cited

U.S. PATENT DOCUMENTS

| | | | |
|---|---|---|---|
| 502,824 | * | 8/1893 | Morse . |
| 2,385,127 | * | 9/1945 | Carlile . |
| 3,745,048 | * | 7/1973 | Dinkler et al. . |
| 5,322,745 | * | 6/1994 | Yanagihara et al. ..................... 429/59 |
| 5,663,007 | * | 9/1997 | Ikoma et al. ............................. 429/53 |
| 5,695,891 | * | 12/1997 | Misra et al. ........................... 429/157 |
| 6,033,800 | * | 3/2000 | Ichiyanagi et al. ................... 429/176 |

FOREIGN PATENT DOCUMENTS

| | | |
|---|---|---|
| 03291867 A | 12/1991 | (JP) . |
| 07235326 A | 9/1995 | (JP) . |

\* cited by examiner

*Primary Examiner*—Gabrielle Brouillette  
*Assistant Examiner*—Tracy Dove  
(74) *Attorney, Agent, or Firm*—Nixon & Vanderhye P.C.

(57) ABSTRACT

An assembled storage battery unit of the collective type includes a plurality of storage batteries assembled as a unit. The storage batteries each include positive and negative electrodes layered through a separator and contained in a bottomed parallelepiped battery casing filled with electrolyte and a closure plate welded to an upper opening end of the battery casing to seal the interior of the battery casing. The battery casings each are integrally formed with a plurality of vertical ribs spaced in parallel at one side wall thereof faced to the corresponding side wall of the battery casing adjacent thereto. The vertical ribs of each of the battery casings are coupled with the corresponding vertical ribs of the battery casing adjacent thereto to form a plurality of vertical ventilation spaces.

5 Claims, 3 Drawing Sheets

ASSEMBLED STORAGE BATTERY UNIT OF THE COLLECTIVE TYPE

BACKGROUND OF THE INVENTION

1. Field of the Invention

The present invention relates to a storage battery such as a nickel-hydrogen storage battery, a lithium-ion storage battery, a nickel-cadmium storage battery, a lead storage battery or the like, and more particularly to an assembled storage battery unit of the collective type composed of a plurality of storage batteries integrally assembled as a unit.

2. Description of the Prior Art

In recent years, development of a high performance storage battery has been required by rapid popularization of portable equipment. Under the circumstances, a sealed type alkaline storage battery superior in charge-discharge characteristics, reliability and ease of maintenance has been used as an electric power source for various kinds of portable equipment. In the sealed type storage battery, oxygen gas generated from the positive electrode in the occurrence of overcharge is absorbed by reaction with the negative electrode for maintaining the battery casing in a sealed condition. The reaction heat caused by absorption of the oxygen gas results in rise of the battery temperature. The rise of the battery temperature does not cause any problem in a small size cylindrical or parallelepiped storage battery of less than 2 Ah currently used.

However, development of a storage battery of large capacity for use in electric automotive vehicles is required in recent years. Such a storage battery of large capacity is provided in the form of an assembled storage battery unit of the collective type composed of a plurality of alkaline storage batteries integrally assembled as a unit. In the storage battery unit of the collective type, sufficient radiation of heat from the batteries is deteriorated due to an increase of the amount of heat generated at charging, and the discharge capacity of the battery unit is therefore decreased, because of the rise in battery temperature caused by accumulation of the now-dissipated heat. In addition, the charge-discharge characteristics of storage batteries located at the opposite sides and central portion of the battery unit become irregular due to a difference in temperature.

In Japanese Patent Laid-open Publication No. 7-235326, there has been proposed an assembled alkaline storage battery unit of the sealed type wherein ventilation spaces are formed among a plurality of storage batteries located adjacent to one another. In the alkaline storage battery unit, each battery casing made of synthetic resin is formed at tis outer surface with a plurality of equally spaced parallel vertical ribs which are retained in contact with the corresponding parallel vertical ribs formed on an adjacent battery casing to form the ventilation spaces. The ventilation spaces are useful to exhaust the heat generated in the battery unit to the exterior therethrough for cooling the storage batteries respectively. This is effective to prevent the occurrence of a difference in temperature among the storage batteries located at the opposite sides and central portion of the battery unit thereby to make more uniform the charge-discharge characteristics of the storage batteries.

In the sealed type alkaline storage battery unit described above, the vertical ribs located at the opposite sides of each storage battery are formed at their upper portions with a projection and a recess respectively and at their lower portions with a recess and a projection respectively. When the storage batteries are assembled as a unit, the projection and recess of the ribs are coupled with the corresponding recess and projection formed on the ribs of the adjacent storage battery for positioning the storage batteries in place. However, engagement of the storage batteries at their ribs positioned in place does not serve to enhance the mechanical strength of the assembled storage battery unit. For this reason, reinforcement members are used for assembly of the storage batteries to enhance the mechanical strength of the assembled storage battery unit. As a result, the manufacturing cost of the storage battery unit is increased, and the assembly process of the storage batteries becomes complicated. In the case that the assembled storage battery unit is used in an electric automotive vehicle, connecting members for connecting the terminals of the storage batteries to one another are disconnected from the terminals if the assembled cells are displaced due to vibration of the vehicle. In addition, it is difficult to effect removal of gas at the recesses in the ribs during molding of the battery casings.

SUMMARY OF THE INVENTION

It is, therefore, a primary object of the present invention to provide an assembled storage battery unit of the collective type in which the battery casings can be molded in a simple manner to enhance the mechanical strength of the battery unit.

According to the present invention, the object is accomplished by providing an assembled storage battery unit of the collective type composed of a plurality of storage batteries assembled as a unit, the storage batteries each including positive and negative electrodes layered through a separator and contained in a bottomed battery casing storing therein an amount of electrolyte and a closure plate welded to an upper opening end of the battery casing to seal the interior of the battery casing, wherein the battery casings each are integrally formed with a plurality of vertical ribs spaced in parallel at one side wall thereof faced to the corresponding side wall of the battery casing adjacent thereto, and wherein the vertical ribs of each of the battery casings are coupled with the corresponding vertical ribs of the battery casing adjacent thereto to form a plurality of vertical ventilation spaces.

According to an aspect of the present invention, there is provided an assembled storage battery unit of the collective type composed of a plurality of storage batteries assembled as a unit, the storage batteries each including positive and negative electrodes layered through a separator and contained in a bottomed battery casing storing therein an amount of electrolyte and a closure plate welded to an upper opening end of the battery casing to seal the interior of the battery casing, wherein the battery casings each are integrally formed with plural pairs of vertical ribs spaced in parallel at one side wall thereof faced to the corresponding side wall of the battery casing adjacent thereto, and wherein the vertical ribs of each of the battery casing are coupled in pairs within vertical spaces formed between the vertical ribs of the battery casing corresponding thereto to form a plurality of vertical ventilation spaces.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENTS

Figure 2:
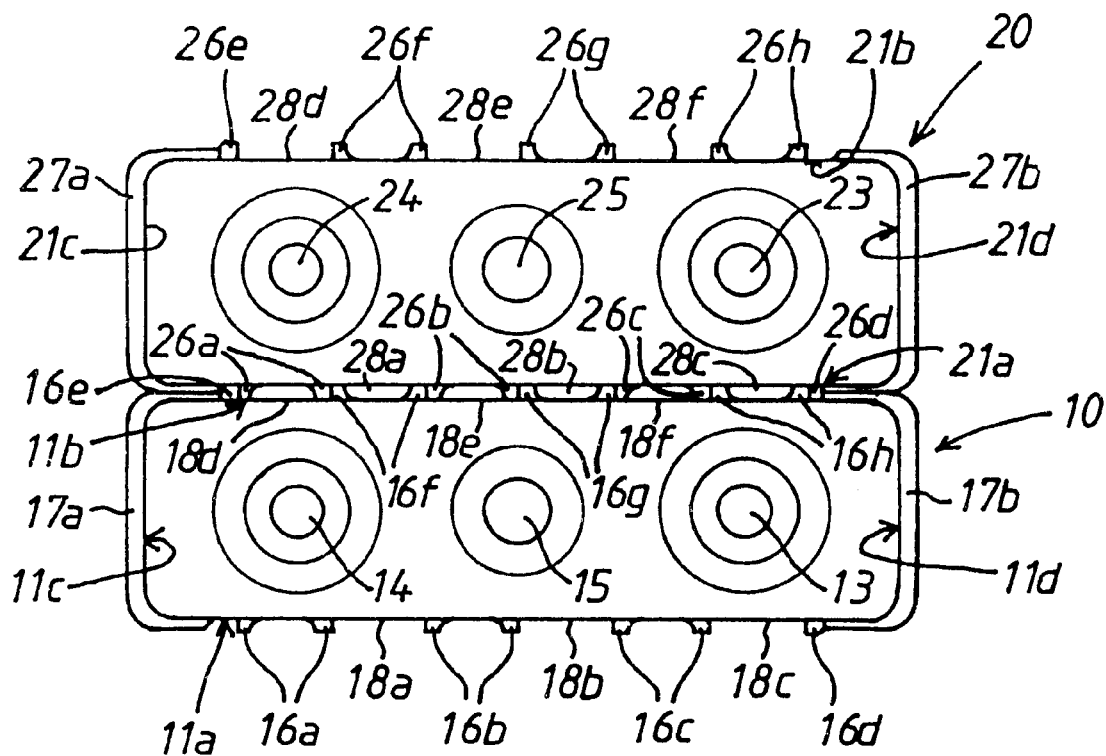
FIG. 2 is a plan view of a portion of the storage battery unit shown in FIG. 1.
Figure 3:
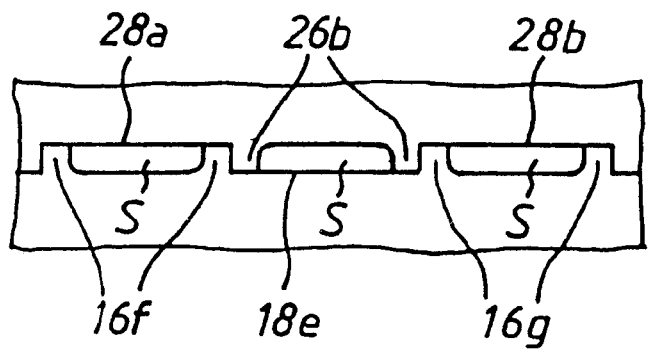
FIG. 3 is a enlarge plan view of the storage battery unit shown in FIG. 2.
Figure 4:
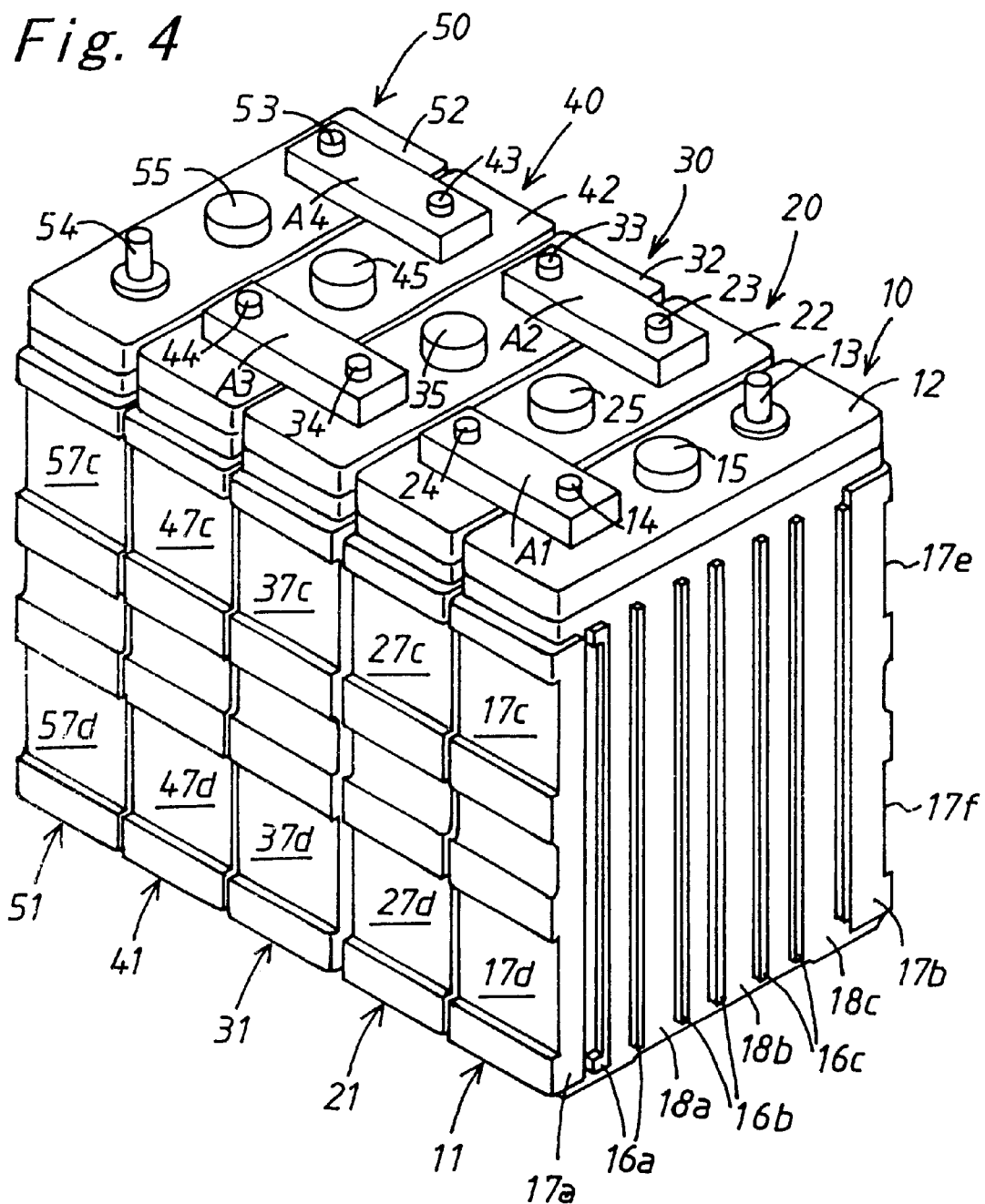
FIG. 4 is a perspective view of the assembled storage battery unit.

In FIGS. 1–4 of the drawings, there is illustrated an assembled storage battery unit of the collective type in accordance with the present invention. As shown in FIG. 4, the storage battery unit is composed of five storage batteries 10, 20, 30, 40, 50 integrally assembled as a unit. As the storage batteries 10–50 are the same in construction, only the construction of storage battery 10 will be described hereinafter, and the same component parts and portions of storage batteries 20–50 as those of storage battery 10 are illustrated with similar reference numerals.

The storage battery 10 includes positive and negative electrodes layered through a separator and contained within a battery casing of synthetic resin such as polypropylene filled with electrolyte and a closure plate 12 of synthetic resin welded by heat to an upper opening end of the battery casing 11 to seal the interior of battery casing 11. The closure plate 12 is provided with positive and negative terminals 13 and 14 and a safety vent valve 15. The positive terminal 13 is welded at its lower end to a current collector extended from the positive electrode, and the negative terminal 14 is welded at its lower end to a current collector extended from the negative electrode.

Figure 1:
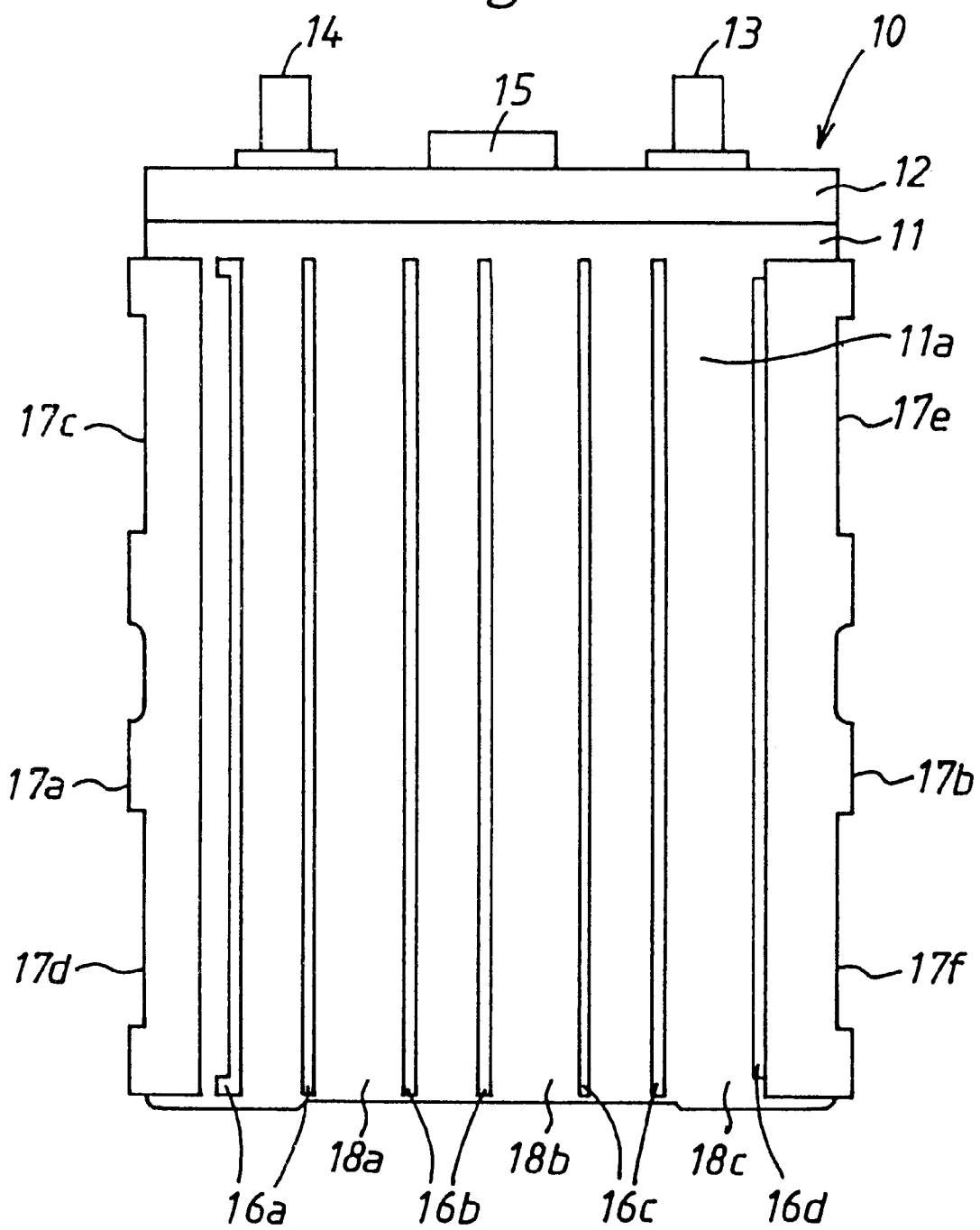
FIG. 1 is a front view of an assembled storage battery unit of the collective type in accordance with the present invention.

As shown in FIGS. 1 and 3, the battery casing 11 is in the form of a rectangular parallelepiped casing formed with front and rear walls 11a, 11b and a pair of side walls 11c and 11d and a bottom wall 11e. The front wall 11a of battery casing 11 is integrally formed at its outer surface with three pairs of vertical ribs 16a, 16b, 16c spaced in parallel and a single vertical rib 16d in parallel with the vertical ribs 16c, while the rear wall 11b of battery casing 11 is integrally formed at its outer surface with a single vertical rib 16e and three pairs of vertical ribs 16f, 16g, 16h spaced in parallel.

On the front wall 11a of battery casing 11, vertical spaces 18a, 18b, and 18c are formed respectively between the two pairs of vertical ribs 16a and 16b, the two pairs of vertical ribs 16b and 16c, and the pair of vertical ribs 16c and the single vertical rib 16d. On the rear wall 11b of battery casing 11, vertical spaces 18d, 18e and 18f are formed respectively between the single vertical rib 16e and the pair of vertical ribs 16f, the two pairs of vertical ribs 16f and 16g, and the two pairs of vertical ribs 16g and 16h. The three pairs of vertical ribs 16a, 16b and 16c on the front wall 11a are positioned to correspond with the vertical spaces 18d, 18e and 18f on the rear wall 11b.

The side walls 11c and 11d of battery casing 11 are formed with thick portions 17a and 17b respectively protruded therefrom. The thick portion 17a of side wall 11c is formed with lateral grooves 17c and 17d spaced in parallel for retaining fastening bands coupled therein, while the thick portion 17b of side wall 11d is formed with lateral grooves 17e and 17f for retaining the fastening bands coupled therein. Similar to the battery casing 11, as shown in FIG. 4, the casings of the storage batteries, 20, 30, 40 and 50 are formed at their one side walls with lateral grooves 27c, 27d; 37c, 37d; 47c, 47d; 57c, 57d; respectively and formed at their opposite side walls with lateral grooves 27e, 27f; 37e, 37f; 47e, 47f; 57e, 57f; respectively. The lateral grooves 17c, 27c, 37c, 47c, 57c, the lateral grooves 17d, 27d, 37d, 47d, 57d, the lateral grooves 17e, 27e, 37e, 47e, 57e, and the lateral grooves 17f, 27f, 37f, 47f, 57f are aligned for retaining the fastening bands coupled there-in.

1) Manufacture of a positive electrode

A predetermined amount of hydroxypropyl cellulose was mixed with a predetermined amount of aqueous solution of nickel hydroxide active material to prepare slurry of an active material. The slurry of active material was impregnated in an active material retention substrate made of foam nickel or nickel sponge of predetermined thickness. Thereafter, the active material retention substrate was sprayed thereon with dispersion of fluoric resin (polytetrafluoroethylene), dried, rolled under pressure in a predetermined thickness and cut into a predetermined shape to prepare a non-sintered type nickel positive electrode.

2) Manufacture of a negative electrode

Misch metal (Mm: a mixture of rare earth elements), nickel (Ni), cobalt (Co), aluminum (Al) and manganese (Ma) were mixed at a ratio by element of 1:3.4:0.8:0.2:0.6, and the mixture was heated in a high frequency induction furnace of argon gas atmosphere to produce an amount of molten alloy. Thus, the molten alloy was cooled in a usual manner to produce an ingot of a hydrogen-absorbing alloy represented by composition formula $Mm_{1.0}Ni_{3.4}Co_{0.8}Al_{0.2}Mn_{0.6}$. The ingot was mechanically pulverized into hydrogen-absorbing alloy powder of about 150 μm in average particle size in an atmosphere of inert gas after coarsely pulverized. The hydrogen-absorbing alloy powder was mixed with aqueous solution of polyethylene oxide and kneaded to prepare slurry of the hydrogen-absorbing alloy. The slurry of the hydrogen-absorbing alloy was coated on opposite surfaces of a punched sheet metal, dried, rolled under pressure in predetermined thickness and cut into a predetermined shape to produce a negative electrode of hydrogen-absorbing alloy.

3) Manufacture of Nickel-hydrogen storage battery

The non-sintered type nickel positive electrode was layered with the negative electrode of hydrogen-absorbing alloy through a separator made of a unwoven polypropylene fiber to produce a set of electrodes. The set of electrodes was contained within the battery casing 11, and an amount of electrolyte such as aqueous solution of potassium hydroxide (KOH), sodium hydroxide (NaOH), lithium hydroxide (LiOH) was stored in the battery casing. Thereafter, the positive terminal 13 was welded at its lower end to a current collector extended from the positive electrode, the negative terminal 14 was welded to a current collector extended from the negative electrode, and the closure plate 12 of synthetic resin was welded by heat to the upper opening end of battery casing 11 to produce a nickel-hydrogen storage battery of 100 Ah in nominal capacity. The storage batteries 10, 20, 30, 40 and 50 each were manufactured in the same manner as described above.

4) Assembly of Nickel-hydrogen storage batteries

In the assembly process of the nickel-hydrogen storage batteries 10–50, the vertical ribs 26a, 26b and 26c formed on the front wall 21a of the storage battery 20 were coupled in pairs within the vertical spaces 18d, 18e and 18f formed on the rear wall 11b of the storage battery 10 in such a manner that vertical ventilation spaces S are formed between the vertical ribs 26a, 16f, 26b, 16g, 26c and 16h respectively as shown in FIGS. 2 and 3. Thus, the storage battery 20 was united with the storage battery 10. The other storage batteries 30, 40 and 50 were united with the storage batteries 20, 30 and 40 in the same manner as described above such that vertical ventilation spaces S are formed between the assembled batteries 20, 30, 40 and 50 to exhaust heat generated in the batteries 10–50 therethrough.

After the storage batteries 10–50 were integrally assembled as a unit, as shown in FIG. 4, the negative terminal 14 of battery 10 was connected to the positive terminal 24 of battery 20 through a connector A1, the positive terminal 23 of battery 20 was connected to the negative terminal 33 of battery 30 through a connector A2, the negative terminal 34 of battery 30 was connected to the positive terminal 44 of battery 40 through a connector A3, the positive terminal 43 of battery 40 was connected to the negative terminal 50 of battery 50 through a connector A4. Thereafter, a pair of end plates (not shown) were attached to opposite ends of the assembled storage battery unit, and the batteries 10–50 are firmly bundled by fastening bands (not shown) respectively coupled within the lateral grooves 17c–57c, 17e–57e and 17d–57d, 17f–57f.

As is understood from the above description, the assembled storage battery unit of the present invention is characterized in that the vertical ribs 26a, 26b and 26c formed on the front wall 21a of the storage battery 20 are coupled in pairs within the vertical spaces 18d, 18e and 18f formed on the rear wall 11b of the storage battery 10 so that vertical ventilation spaces S are formed between the vertical ribs 26a, 16f, 26b, 16g, 26c and 16h respectively. In such assembled construction of the storage battery unit, the storage batteries 10 and 20 are firmly coupled with each other to enhance the mechanical strength of the battery unit, and the vertical ventilation spaces formed between the vertical ribs 26a, 16f, 26b, 16g, 26c and 16h are useful to exhaust the heat generated in the storage battery unit for cooling the storage batteries 10 and 20. This is effective to prevent the occurrence of a difference in temperature among the assembled storage batteries 10–50 and to uniform the charge-discharge characteristics of the assembled storage batteries.

Although in the embodiment described above, the assembled storage battery unit has been composed of five nickel-hydrogen storage batteries, the present invention may be adapted to an assembled storage battery unit composed of a plurality of lithium-ion storage batteries, nickel-cadmium storage batteries, lead storage batteries or other kinds of storage batteries.

What is claimed is:

1. An assembled storage battery unit composed of a plurality of storage batteries assembled as a unit, the storage batteries each including positive and negative electrodes layered through a separator and contained in a bottomed battery casing storing therein an amount of electrolyte and a closure plate welded to an upper opening end of the battery casing to seal the interior of the battery casing, wherein the battery casings each are integrally formed with a plurality of vertical ribs spaced in parallel at one side wall thereof faced to the corresponding side wall of the battery casing adjacent thereto, the vertical ribs each having a flat surface faced to the corresponding side wall of the battery casing adjacent thereto and side surfaces perpendicular to said corresponding side wall, and wherein the vertical ribs of the respective battery casings are engaged at their side surfaces with the side surfaces of the corresponding vertical ribs of the battery casing adjacent thereto to retain the battery casings in position and to form a plurality of vertical ventilation spaces.

2. An assembled storage battery unit composed of a plurality of storage batteries assembled as a unit, the storage batteries each including positive and negative electrodes layered through a separator and contained in a bottomed battery casing storing therein an amount of electrolyte and a closure plate welded to an upper opening end of the battery casing to seal the interior of the battery casing in a liquid tight manner, wherein the battery casings each are integrally formed with plural pairs of vertical ribs spaced in parallel at one side wall thereof faced to the corresponding side wall of the battery casing adjacent thereto, the vertical ribs each having a flat surface faced to the corresponding side wall of the battery casing adjacent thereto and side surfaces perpendicular to said corresponding side wall, wherein each pair of vertical ribs of the respective battery casings are engaged at their side surfaces with the corresponding pair of vertical ribs of the battery casing adjacent thereto to retain the battery casings in position and to form a plurality of vertical ventilation spaces.

3. An assembly of plural battery cell casings, each battery cell casing having opposed parallel side walls with protruding vertical ribs each having an outer flat surface and two parallel side surfaces, the vertical ribs on one side wall being offset from those on the other side wall such that the vertical ribs of stacked adjacent cell casings are coupled in pairs and their respective side surfaces are interlocked with each other.

4. The assembly of plural battery cell casings, as in claim 3, said plural casings being held together by the interlocked vertical ribs of adjacent side walls forming vertical ventilation spaces.

5. An assembly as in claim 4 wherein the vertical ribs of each adjacent cell casing engages the wall of the next adjacent cell casing between its vertical ribs.

* * * * *